No. 781,944. PATENTED FEB. 7, 1905.
J. L. HALL.
SPEED REDUCING GEARING.
APPLICATION FILED SEPT. 3, 1903.

Witnesses:
George H. Tilden
Helen Orford

Inventor:
John L. Hall.
by Albert H. Davis
Att'y

No. 781,944.

Patented February 7, 1905.

UNITED STATES PATENT OFFICE.

JOHN L. HALL, OF SCHENECTADY, NEW YORK, ASSIGNOR TO GENERAL ELECTRIC COMPANY, A CORPORATION OF NEW YORK.

SPEED-REDUCING GEARING.

SPECIFICATION forming part of Letters Patent No. 781,944, dated February 7, 1905.

Application filed September 3, 1903. Serial No. 171,718.

*To all whom it may concern:*

Be it known that I, JOHN L. HALL, a citizen of the United States, residing at Schenectady, in the county of Schenectady, State of New York, have invented certain new and useful Improvements in Speed-Reducing Gearings, of which the following is a specification.

This invention relates to gearing; and its object is to provide a compact organization of worms and worm-gears by means of which the speed of motion transmitted from a driving to a driven element of machinery may be very greatly reduced.

The invention consists of certain combinations and arrangements of parts hereinafter set forth, and particularly pointed out in the claims.

Figure 1:
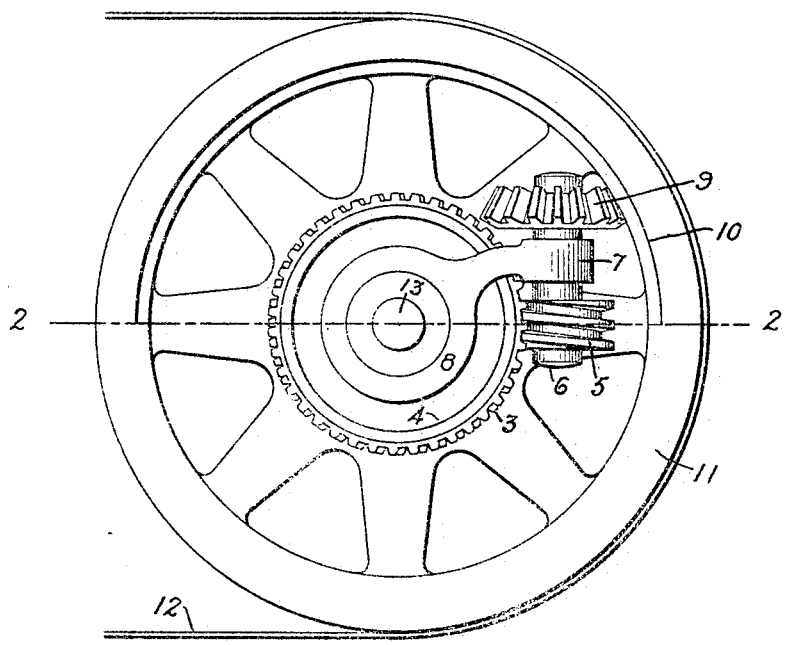
Figure 2:
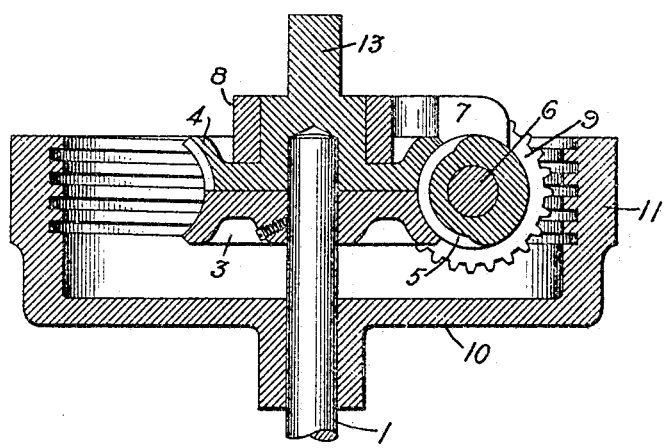

In the accompanying drawings, Figure 1 is an end elevation of my improved gearing. Fig. 2 is a diametrical section thereof on the line 2 2, Fig. 1; and Fig. 3 is a modification.

Figure 3:
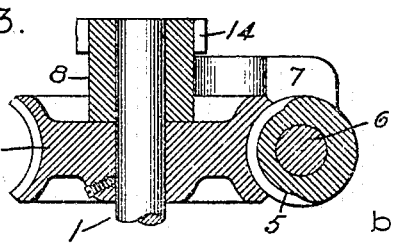

The shaft 1 is stationary, and secured rigidly to it is a worm-gear, which may be a complete gear 2, as shown in Fig. 3, but is preferably only a half-gear 3, as shown in Fig. 2, the other half, 4, being rotatable on the stationary shaft and having one tooth more or less than the half 3. Meshing with the gear 2 or with the half-gears 3 4 is a worm 5, secured to a shaft 6, which is tangential to the gear and is journaled in a suitable bearing in an arm 7, rotatably mounted concentric with the shaft 1, preferably by having a hub 8 sleeved on the hub of the half-gear 4, as in Figs. 1 and 2, or on the shaft 1, as in Fig. 3. The shaft 6 carries also a worm-wheel 9, which meshes with a driving-worm 10, preferably a pulley having a laterally-projecting flange 11, concentric with the shaft 1 and provided with an internal worm, as shown in Fig. 2. This driving-worm is rotatably mounted on the stationary shaft 1 and is connected in any suitable manner with the driving element of the machine, as by a belt 12 engaging with the outer periphery of the flange 11. The driven element of the machine is suitably connected with the loose half 4 of the worm-gear by means of a shaft portion 13 concentric with the shaft 1, as in Figs. 1 and 2, or with gear-teeth 14 on the hub of the arm 7, as shown in Fig. 3.

The operation of the device is as follows: When the driving-worm is rotated, it rotates the worm-wheel 9 and its shaft 6 and the second worm 5. As said second worm meshes with the stationary worm-gear it causes the arm 7 to travel planetary fashion around said gear, the rate of travel depending on the pitch of the two worms and the number of teeth in the worm-wheel and worm-gear. Thus if it requires one revolution of the driving-worm to move the worm-wheel one tooth and if said wheel has twenty-five teeth and one revolution thereof is necessary to carry the arm along one tooth of the worm-gear and if said gear has forty teeth, then it will require one thousand revolutions of the driving-worm to effect one revolution of the arm. This is the ratio of speed in the construction shown in Fig. 3. A still slower movement is given by the construction shown in Figs. 1 and 2, since the differential action of the halves of the worm-gear causes the movable half to advance only one tooth for every revolution of the arm, so that forty thousand revolutions of the driving-worm will be necessary to effect one revolution of the half-gear 4 and its shaft portion 13.

In accordance with the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In a speed-reducing gearing, the combination with a driving-worm, of a stationary worm-gear, a planetary shaft, a worm carried by said shaft and meshing with said gear and a worm-wheel meshing with the driving-worm, and means actuated by the planetary parts for transmitting power.

2. In a speed-reducing gearing, the combination with an annular driving-worm, of a stationary worm-gear concentric therewith, an arm freely rotatable concentric with said gear, a shaft journaled in said arm, a worm on said shaft meshing with said gear, a worm-wheel on said shaft meshing with the driving-worm, and means actuated by the parts on said shaft for transmitting power.

3. In a speed-reducing gearing, the combination with a driving-worm, of a worm-wheel meshing therewith, a second worm driven by said wheel, differential worm-gears meshing with the second worm, and means driven by one of said gears for transmitting power.

4. In a speed-reducing gearing, the combination with a driving-worm, of differential worm-gears concentric therewith, one of which is stationary, a planetary shaft, a worm carried by said shaft and meshing with said gears and a worm-wheel meshing with the driving-worm, and means driven by the movable gear for transmitting power.

5. In a speed-reducing gearing, the combination with an annular driving-worm, of differential worm-gears concentric therewith, intermediate gearing comprising an arm freely rotatable concentric with said gears, a shaft journaled in said arm, a worm on said shaft meshing with said gears, and a worm-wheel on said shaft meshing with the driving-worm, and means driven by one of said gears for transmitting power.

6. In a speed-reducing gearing, the combination with two differential worm-gears one of which is stationary, of an arm freely rotatable concentric with said gears, a shaft journaled in said arm, a worm on said shaft meshing with said gears, a worm-wheel on said shaft, an annular internal worm concentric with said differential gears and meshing with the worm-wheel on the shaft, and means connected to the movable gear for transmitting power.

In witness whereof I have hereunto set my hand this 2d day of September, 1903.

JOHN L. HALL.

Witnesses:
BENJAMIN B. HULL,
HELEN ORFORD.